(12) United States Patent
Jiang et al.

(10) Patent No.: US 9,098,342 B2
(45) Date of Patent: Aug. 4, 2015

(54) EXTRACTING OVERLAY INVARIANTS NETWORK FOR CAPACITY PLANNING AND RESOURCE OPTIMIZATION

(75) Inventors: Guofei Jiang, Princeton, NJ (US); Hanhuai Shan, Princeton, NJ (US); Kenji Yoshihira, Princeton Junction, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 554 days.

(21) Appl. No.: 12/818,773

(22) Filed: Jun. 18, 2010

(65) Prior Publication Data

US 2011/0072130 A1    Mar. 24, 2011

Related U.S. Application Data

(60) Provisional application No. 61/243,755, filed on Sep. 18, 2009.

(51) Int. Cl.
 *G06F 9/50* (2006.01)
 *G06F 11/34* (2006.01)
 *H04L 12/24* (2006.01)
 *H04L 29/08* (2006.01)

(52) U.S. Cl.
 CPC .......... *G06F 9/5061* (2013.01); *G06F 11/3442* (2013.01); *G06F 11/3452* (2013.01); *H04L 41/0896* (2013.01); *H04L 41/142* (2013.01); *G06F 9/5027* (2013.01); *H04L 67/1008* (2013.01)

(58) Field of Classification Search
 CPC . G06F 9/5027; G06F 9/5061; G06F 11/3452; G06F 11/3442; H04L 41/0896; H04L 41/142; H04L 67/1008

USPC .......................................... 709/224, 238–244
See application file for complete search history.

(56) References Cited

U.S. PATENT DOCUMENTS

| | | | | |
|---|---|---|---|---|
| 6,862,624 | B2* | 3/2005 | Colby et al. .................. | 709/226 |
| 7,113,986 | B2* | 9/2006 | Goldszmidt et al. .......... | 709/223 |
| 7,403,988 | B1* | 7/2008 | Blouin et al. ................. | 709/223 |
| 7,519,705 | B1* | 4/2009 | Papagiannaki et al. ....... | 709/224 |
| 8,046,767 | B2* | 10/2011 | Rolia et al. .................... | 718/104 |
| 8,224,624 | B2* | 7/2012 | Cherkasova et al. .......... | 702/182 |
| 8,543,711 | B2* | 9/2013 | Rolia et al. .................... | 709/229 |
| 2002/0059237 | A1* | 5/2002 | Kumagai et al. ................. | 707/9 |
| 2005/0267702 | A1* | 12/2005 | Shah et al. ...................... | 702/81 |
| 2011/0270646 | A1* | 11/2011 | Prasanna et al. ............. | 705/7.27 |

OTHER PUBLICATIONS

Arlitt et al., "Web Server Workload Characterization: The Search for Invariants (Extended Version)", Mar. 15, 1996, p. 1-15.*

* cited by examiner

*Primary Examiner* — Gregory Todd
(74) *Attorney, Agent, or Firm* — Joseph Kolodka (57) ABSTRACT

A method and system determines capacity needs of components in a distributed computer system. In the method and system, a pair-wise invariant network is determined from collected flow intensity measurements. The network includes at least two separate and unconnected pair-wise invariant subnetworks, each of the subnetworks including two of the flow intensity measurements connected by a pairwise invariant, each of the pair-wise invariants characterizing a constant relationship between their two connected flow intensity measurements. At least one overlay invariant is determined from the pair-wise invariant network and from the collected flow intensity measurements using a minimal redundancy least regression process. The capacity needs of the components are determined using the pair-wise and overlay invariants.

12 Claims, 8 Drawing Sheets

EXTRACTING OVERLAY INVARIANTS NETWORK FOR CAPACITY PLANNING AND RESOURCE OPTIMIZATION

RELATED APPLICATIONS

This application claims the benefit of U.S. Provisional Application No. 61/243,755, filed Sep. 18, 2009, the entire disclosure of which is incorporated herein by reference.

FIELD

The present disclosure relates to distributed transaction computer systems. More particularly, the present disclosure relates to capacity planning and resource optimization in distributed transaction computer systems.

BACKGROUND

The great progress in online services during the last decade has led to a dramatic increase of system complexity. Nowadays, typical systems such as GOOGLE and AMAZON contain thousands of components including operating systems, application software, servers, and networking and storage devices, which deal with millions of user queries or transactions every day. Users of online services always expect high Quality of Services (QoS), which has as one important criterion short latency, among others.

However, a sudden increase of user workload will probably lead to a system bottleneck on some components, hence deteriorates QoS. While sufficient hardware resources need to be deployed to ensure high QoS, meanwhile, an oversized system with scale could be a huge waste of resources. Therefore, it is very important to match resource assignments with capacity needs for each component in large scale systems.

Although static capacity planning for standalone software might be simple, it is difficult to specify the capacity needs for online service systems because they usually vary with user workloads. In other words, fixed numbers of capacity are not able to give a good specification. Due to the dynamic nature of user workloads, a mathematical model is highly desired to capture their hidden relationship with system capacity needs. Moreover, the model should be general enough to be applicable to different types of system resources, such as CPU, disk I/O, memory, and so on.

Co-pending U.S. patent application Ser. No. 11/860,610, filed Sep. 25, 2007, and assigned to the assignee herein, addresses the capacity planning problems associated with large scale computer systems. U.S. patent application Ser. No. 11/860,610 discloses a method and apparatus that extracts pair-wise relationships between computer system measurements, but does not address relationships involving multiple system measurements.

Accordingly, a method and apparatus is needed for capacity planning and resource optimization in large scale computer systems, which addresses the relationship among multiple system measurements.

SUMMARY

A method is disclosed herein for determining the capacity needs of components in a distributed computer system. In the method, a pair-wise invariant network is determined from collected flow intensity measurement metrics or nodes. The network includes at least three separate and unconnected pair-wise invariant subnetworks, each of the subnetworks including two or more of the measurement nodes and one or more pairwise invariants, each of the pairwise invariants connecting two of the two or more measurement nodes, and each of the pair-wise invariants characterizing a constant relationship between their two connected measurement nodes. One of the measurement nodes is selected from each of the subnetworks as a representative measurement node. A minimal redundancy least regression process is performed to extract at least one overlay invariant from the representative measurement nodes. The capacity need of the at least one component is determined using the pair-wise and overlay invariants An apparatus is also disclosed herein for determining the capacity needs of the components in a distributed computer system. The apparatus comprises a processor executing instructions for determining, from collected flow intensity measurement nodes, a pair-wise invariant network, the network including at least three separate and unconnected pair-wise invariant subnetworks, each of the subnetworks including two or more of the flow intensity measurement nodes and one or more pairwise invariants, each of the pairwise invariants connecting two of the two or more measurement nodes, and each of the pair-wise invariants characterizing a constant relationship between their two connected measurement nodes. The processor of the apparatus also executes instructions for selecting one of the measurement nodes from each of the subnetworks as a representative nodes and performing a minimal redundancy least regression to extract at least one overlay invariant from the representative nodes. The capacity needs of the components are determined using the pair-wise and overlay invariants.

DETAILED DESCRIPTION

Figure 1:
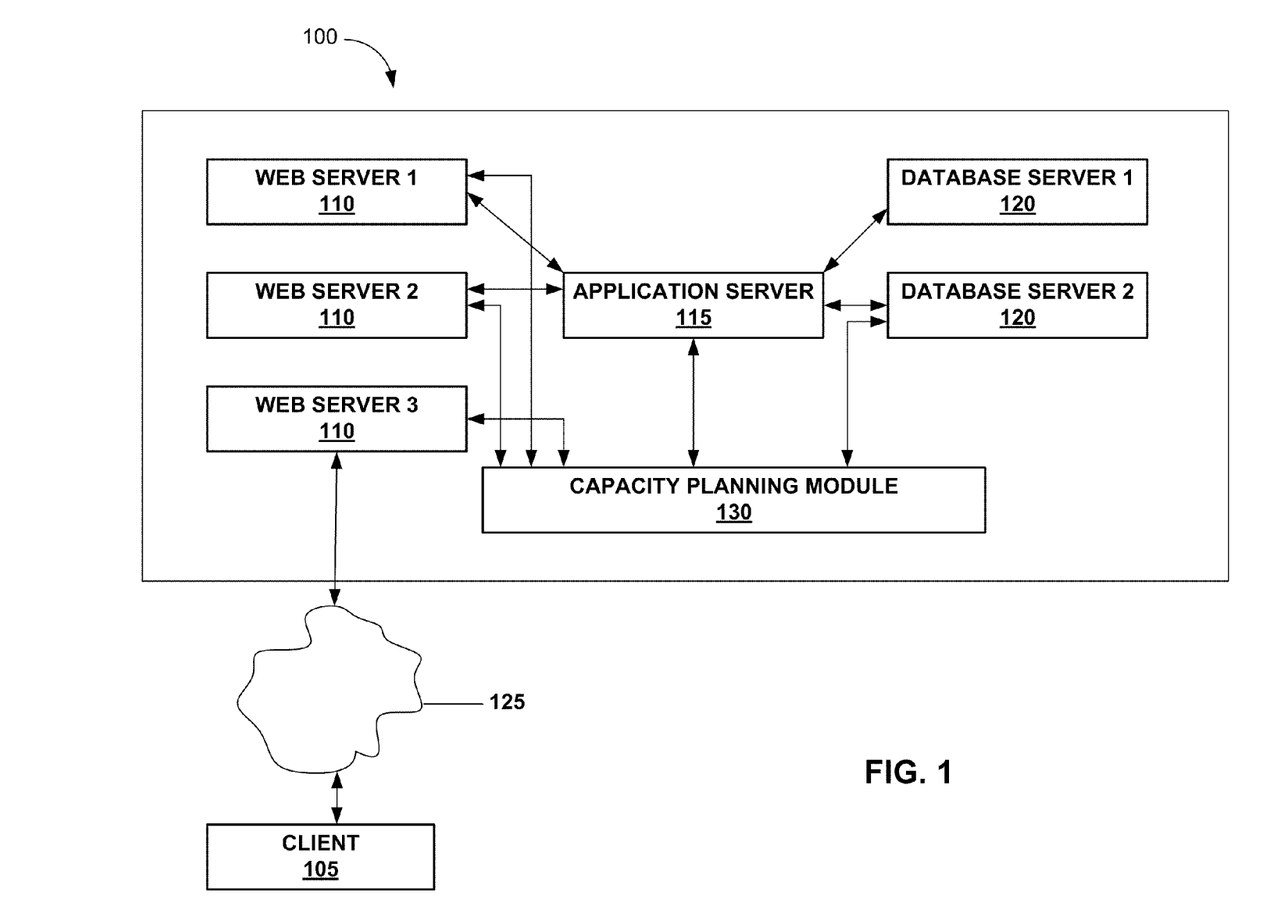
FIG. 1 is a block diagram of an exemplary embodiment of a distributed transaction computer system (distributed computer system).

A method and apparatus are disclosed herein for estimating or planning the capacity needs of the components of a distributed transaction (large scale) computer system using pair-wise and overlay invariants of the system. Most distributed transaction computer systems, such as Internet services, employ multi-tier architectures to integrate their components. FIG. 1 shows an exemplary embodiment of a distributed transaction computer system 100 (distributed computer system). The distributed computer system 100 includes a three-tier architecture that contains a web tier having three web servers 110 a middleware tier having an application server 115, and a database tier having two database servers 120. One or more individual client computers 105 at a plurality of locations can communicate with the web servers 110 via a communication network 125, such as the Internet. The web servers 110 communicate with other servers, such as the application server 115 and the database servers 120.

The web servers 110 operate as an interface, or gateway, to present data to the browser of the one or more client computers 105. The application server 115 supports specific business, or application logic for various applications, which generally includes the bulk of an application. The database servers 120 are used for data storage.

The distributed computer system 100 further includes a capacity planning module 130 to determine the resources needed for the distributed computer system 100. The capacity planning module 130 can be executed on one or more of the web, application, and database servers 110, 115, 120. Alternatively, the capacity planning module 130 can be executed on its own server or computer (not shown).

One of ordinary skill in the art will appreciate that the methods described herein can be applied to distributed computer systems having other types of components and tiers.

The web, application, and database components 110, 115, and 120 of the distributed computer system 100 shown in FIG. 1, can be built from a number of software packages running on servers (computers) which provide similar functionality. For example, such software packets can include, without limitation, Apache and IIS for the web servers 110, WebLogic and WebSphere for the applications server 115, and Oracle and DB2 for the database servers 120.

During operation, the distributed computer system 100 produces large amounts of monitoring data or metrics, such as log files, to track its operational status. In accordance with the method and apparatus of the present disclosure, these metrics are measured from the various components of the distributed computer system 100, i.e., the web, application and data servers 110, 115 and 120, the client computers 105, the system networks, and from the application workloads. CPU usage, network traffic volume, and number of SQL queries are non-limiting examples of monitoring metrics that may be measured. Measurement metrics of various resource utilizations can be obtained from the web, application and data servers 110, 115 and 120 and the client computers 105, such as CPU, memory, and disk utilizations. Measurement metrics about network packets can be obtained from the networks of the distributed computer system. System workload measurement metrics can be obtained as the number of user requests entering the distributed computer system. User requests traverse a set of the system components and software paths according to application logic. Much of the internal monitoring metrics of the distributed computer system reacts to the volume of user requests.

While a large volume of user requests flow through various components in the distributed computer system 100, many resource consumption related measurement metrics respond to the intensity of user loads, accordingly. Therefore, flow intensity, as used herein, refers to the intensity with which internal measurement metrics respond to the volume of (i.e., number of) user loads. Based on this definition of flow intensity, constant linear relationships between two flow intensities can be determined at various points across the distributed computer system 100 in accordance with the present disclosure. If a constant linear relationship between two flow intensity measurement metrics always hold true under various workloads over time, this linear relationship is referred to herein as a pair-wise invariant or pair-wise invariant model of the distributed computer system 100.

Figure 2:
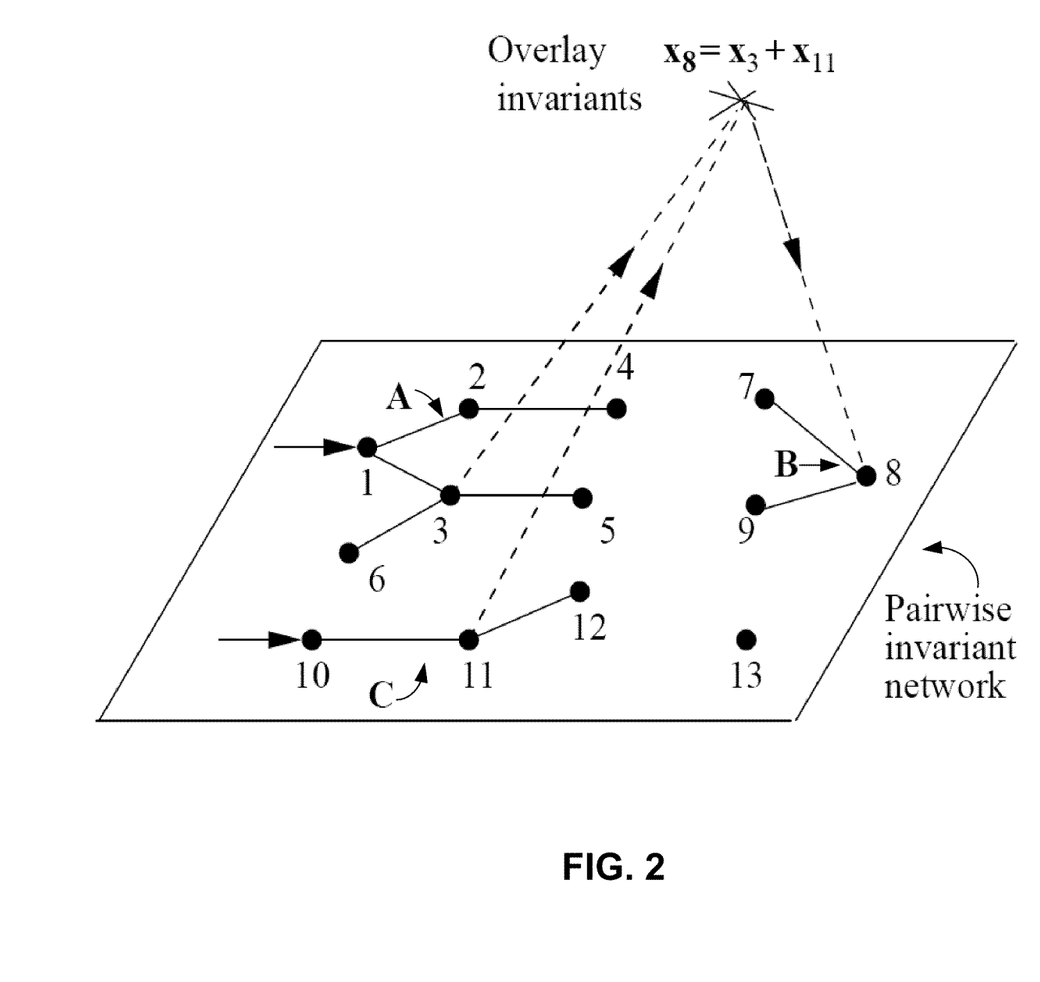
FIG. 2 is a graphical illustration of pair-wise and overlay invariant networks.

Pair-wise invariants are in a form of a linear regression model as $x_1 = f(x_2) = wx_2 \, w_0$, where $x_1$ and $x_2$ are different distributed computer system measurements. As shown in FIG. 2, each pair of system measurement metrics (hereianfter referred to as nodes) is connected by an invariant, where each node denotes one system measurement metric and a solid line between two nodes denotes an invariant between the two nodes. The pair-wise invariant coupled nodes form a pair-wise invariant network.

Although the pair-wise invariants provide a relatively general model for capacity planning, they only capture relationships between two different system measurements, while some relationships involve multiple ones as in the three-tier distributed computer system of FIG. 1. In the three-tier system of FIG. 1, there is a summing up/splitting relationship between the web servers 110 and the application server 115, or between the application server 115 and database servers 120.

Referring again to FIG. 2, the pair-wise invariants connect pairs of system measurement metrics to form several disconnected pair-wise invariant groups or subnetworks (subnets) A, B and C in the network, therefore, the value of the measurement metrics can be propagated only within the corresponding subnet. For example, if $x_2 = g(x_1)$ and $x_4 = h(x_2)$ then $x_4 = h(g(x_1))$. Hence, given a user workload at node 1, the corresponding value for node 4 can be calculated. However, the invariants cannot be propagated across the subnets A, B, and C of the network because the nodes/measurement metrics in different subnets A, B, and C are isolated from one another. The information contained in the system measurement metrics in one subnet cannot help the capacity planning for the nodes in the other subnets. For example, given a workload at node 1 and a workload at node 10, there is no way to determine the value for node 8, via the pair-wise invariant networks because there is no pair-wise invariant between the subnets B and A, or the subnets B and C. However, in accordance with the present disclosure, overlay invariants (shown with dotted arrows in FIG. 2) are used for connecting the system measurement nodes in each of the subnets A, B and C, e.g., $x_8 = x_3 + x_{11}$. The estimated value for system measurement node 8 can then be obtained through propagation following:

$$\left.\begin{array}{l} x_1 \to x_3 \\ x_{10} \to x_{11} \end{array}\right\} \Rightarrow x_8$$

The overly invariants are disposed over the pair-wise invariant network, and act like bridges to connect the originally separated pair-wise invariant subnets A, B, And C together. The overlay invariants take multiple inputs ($x_1 \to x_3$ and $x_{10} \to x_{11}$) because an exhaustive search has been done for the pair-wise invariants.

Figure 3:
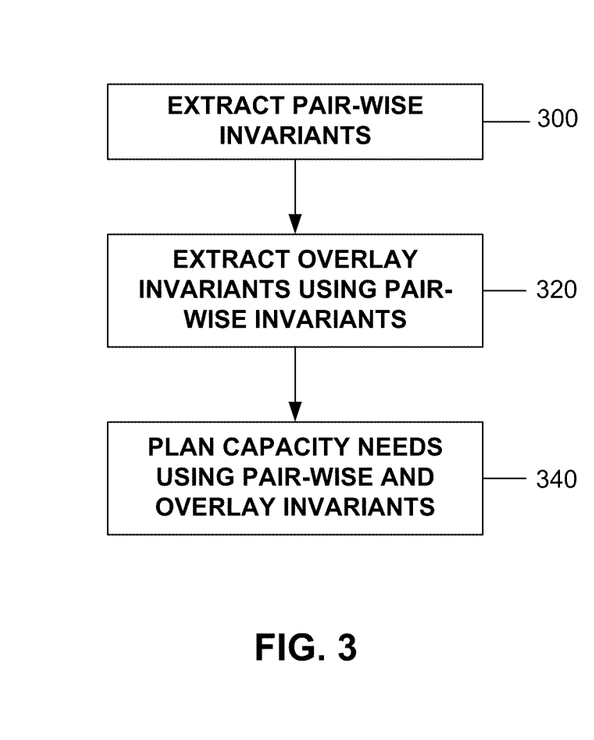
FIG. 3 is a high level flow chart of an embodiment of the pair-wise and overlay invariants-based capacity planning method performed by the capacity planning module.

FIG. 3 is a flow chart illustrating an exemplary embodiment of the method for estimating or planning the capacity needs of a distributed computer system. In block 300, pair-wise invariants, which connect system measurement nodes together to generate a pair-wise invariant network, are extracted or determined from system monitoring metrics collected from the distributed computer system. The extracted pair-wise invariant network includes two or more separated pair-wise invariant subnets. In some embodiments, the extracted pair-wise invariant network can include one or more isolated system measurement nodes as shown in FIG. 2.

In block 320, overlay invariants are extracted using representative system measurement nodes selected from each of the pair-wise invariant subnets of the pair-wise invariant network. The extracted overlay invariants form an overlay invariant network that connects together the originally separated pair-wise invariant subnets, as well as any isolated measurement nodes, thereby enabling the volume of workload to propagate across the previously disconnected subnets for capacity planning.

In block 340, the capacity needs of the components of the distributed computer system are estimated using the pair-wise invariant network and the corresponding overlay invariant network. The resulting overlay invariant network extends the connectivity among the previous disconnected pair-wise subnets so that the volume of workloads can be propagated to more nodes (system components) in distributed computer systems to estimate the capacity needs and optimize resource optimization. So with the same monitoring measurement metrics, it is possible to obtain higher quality capacity planning and resource optimization because the overlay invariant network extends the connectivity between the volume of workload and the resource usages of various computer system components.

Figure 4:
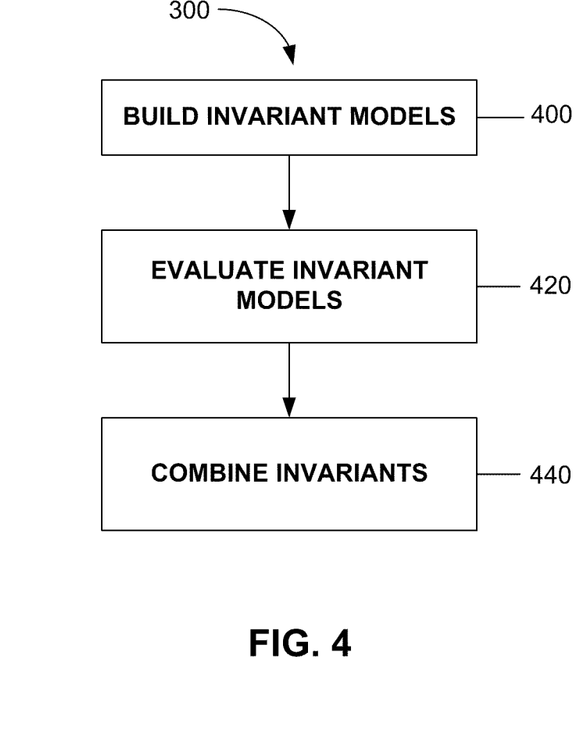
FIG. 4 is a flow chart illustrating an embodiment of the pair-wise invariant extraction process.

FIG. 4 is a flow chart illustrating an exemplary embodiment of a method for performing the pair-wise invariant extraction process of block 300 in FIG. 3. In block 400, an ensemble of invariant models are built to correlate the large amount of monitoring data collected from various points of the distributed computer system. If, in block 420, the discovered correlations can continually hold under different user scenarios and workloads, they are regarded as invariants of the distributed computer system. Each invariant contains a specific dependency relationship among the measurement nodes, which reveals some specific properties of the distributed computer system. All the discovered invariants are combined in block 440 to form an invariant network, which gives a comprehensive view of the distributed computer system.

The invariant extraction method defines flow intensity $x_i$ as an intensity measurement node of resource consumption related data, such as CPU usage, network traffic volume, etc. For every pair of measurement nodes $(x_i, x_j)$, the method extracts a linear relationship in the form of $x_i = w_1 x_j + w_0$, which is evaluated by a fitness score. For any measurement $x = x(1) \ldots x(T)$ over time $t = 1 \ldots T$, given the estimation $\hat{x} = \hat{x}(1) \ldots \hat{x}(T)$, the fitness score is defined as $$f = \left[ 1 - \sqrt{\frac{\sum_{t=1}^{T} |x(t) - \hat{x}(T)|^2}{\sum_{t=1}^{T} |x(t) - \bar{x}|^2}} \right], \quad (1)$$

where $\bar{x}$ is the mean of real $\bar{x}(t)$ over $t = 1 \ldots T$. The range of the fitness score is $(-\infty, 1]$. The higher the fitness score, the greater the consistency between the estimated value and the real value of a measurement node $x_i$, and therefore, the better the pair-wise relationship $x_i = w_1 x_j + w_0$ is. Among all extracted pair-wise relationships, only those with a fitness score higher than a given threshold are considered pair-wise invariants. In one embodiment, the given threshold is 0.9. In other embodiments, the given threshold can be other values. Although the fitness score is a property of invariants/relationships, the fitness score for the pair-wise relationship between $x_i$ and $x_j$ is also a metric of the linearity between two measurement nodes, a higher fitness score indicating a stronger linear relationship. Therefore, it could also be considered as a property of the measurement node pair. For more details regarding methods and apparatus for extracting pair-wise invariants for capacity planning and resource optimization in distributed computer systems, see co-pending U.S. patent application Ser. No. 11/860,610 filed Sep. 25, 2007, the entire disclosure of which is incorporated herein by reference.

In one embodiment, the overlay invariant relationships are extracted from multiple system measurements using Least Angle Regression (LAR), which is a well known regression algorithm for variable selection. Given a response, LAR selects one input at a time based on the correlation between the candidate inputs and the response. The selection at each step is dependent on all previous selections. Therefore, the first selected input is the most important and it affects all the following selections. The number of steps can be determined by a simple $C_p$ statistic. The result of LAR is a regression model as $$y = w_0 + w_1 x_{j1} + \ldots w_s x_{ju},$$

where $x_{j1}, \ldots x_{ju}$ are the subset of inputs selected, and $w_0, \ldots w_{ju}$ are the coefficients for the inputs. LAR is closely related to least absolute shrinkage and selection operator (Lasso), which minimizes the residual sum of squares, subject to a constraint on the $l_1$ norm of regression coefficients, i.e., $$\min \left\| y - \left( w_0 + \sum_j w_j x_j \right) \right\|_2^2 \text{ subject to } \sum_i |w_j| \leq t.$$

The $l_1$ penalized regression forces most of the coefficients $w_j$ to become zero. Only the inputs with non-zero coefficients are selected for regression. These inputs are considered as factors really affecting the response.

A method for generating the overlay invariant network given the pair-wise invariant network will now be described in greater detail. The overlay invariants of the overlay invariant network are in a form of a regression model $$x_i = w_0 + w_1 x_{j1} + w_2 x_{j2} + \ldots + w_n x_n,$$

The task of extracting the overlay invariants includes discovering a set of measurement metrics or nodes $\{x_{j_1} \ldots x_{j_n}\}$ which together determines the value of the response measurement metric $x_i$, and then, estimating the coefficients wi.

Figure 5:
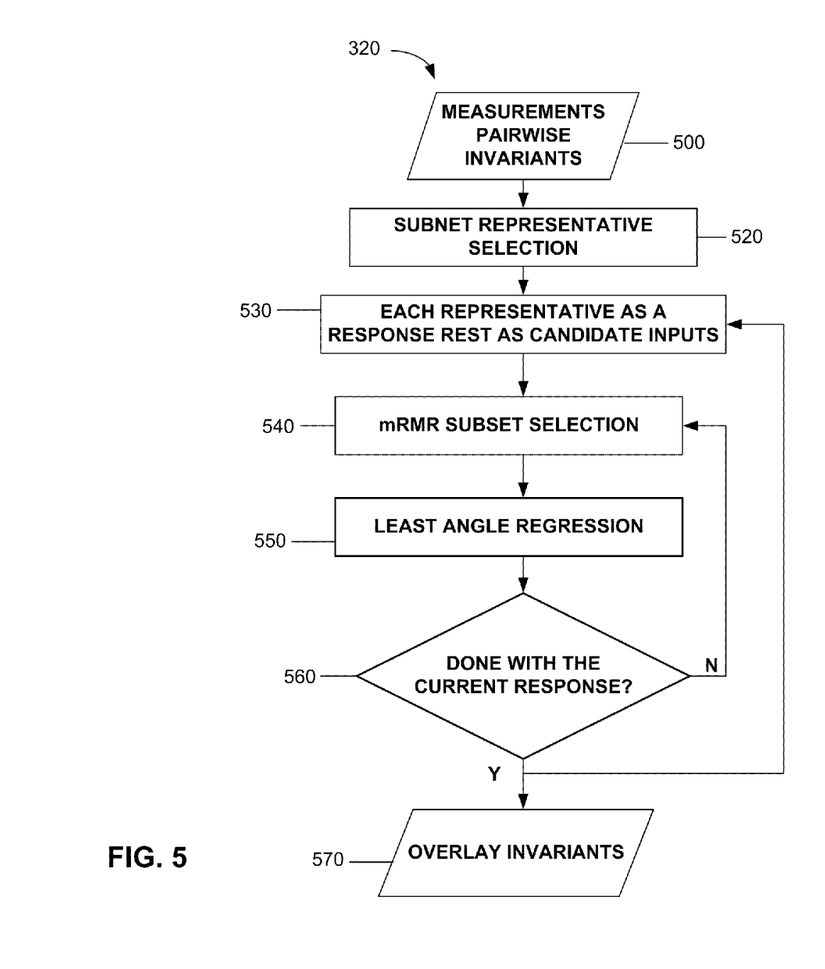
FIG. 5 is a flow chart illustrating an embodiment of the overlay invariant extraction process.

FIG. 5 is a flow chart illustrating an exemplary embodiment of a method for performing the overlay invariant extraction process of block 320 in FIG. 3. Given the pair-wise invariant network as an input in block 500, a representative measurement node is selected in block 520 for each subnet of the pair-wise invariant network. In block 530, At each time, among all selected representative measurement node, one is selected as a response variable and the remaining nodes are considered as a candidate input set for the response variable. In block 540, a minimal redundancy least regression (mRLR) process is performed. The mRLR process combines a minimal redundancy maximal relevance (mRMR) subset selection process that is performed given the candidate set, with a LAR process that is performed on the mRMR subset. The mRMR component of the mRLR process determines the search space and the LAR component of the mRLR process determines the coefficient parameters. For example, given six (6) measurement nodes r, s, t, x, y, and z, the mRMR process would determine which of these nodes are most likely to have a relationship between or among each other. For instance, the mRMR process may determine that measurement nodes x, y, and z are most likely to have a relationship among the measurement nodes r, s, t, x, y, and z. The LAR process would then determine the relationship among the nodes that have been determined by the mRMR process to most likely have a relationship. Thus, measurement nodes x, y, and z selected by the mRMR process, may be determined by the LAR process to have the relationship x=2y+3z. In block 550, if all representative measurement nodes are selected as the response variable once, an overlay invariant network (i.e. many overlay invariants, not one) is outputted in block 560. If not, the algorithm goes back to block 530 and chooses a new response variable to repeat the mRMR and LAR processes.

The subnet representative selection process of block 520 (FIG. 5) will now be described in greater detail. All system measurement nodes inside a subnet have strong linear relationships, directly or indirectly. If one system measurement node in the subnet participates in the overlay invariant network, the estimated value for the node can be propagated to all the other nodes in the same subnet. Therefore, one system measurement node can be selected from each subnet as a representative system measurement node of the subnet and these representative nodes can then be used to generate the overlay invariants. Each representative system measurement node operates like a base station to reach the other system measurement nodes in its corresponding subnet. In large scale computer systems containing thousands or even millions of measurement nodes, selecting representative nodes dramatically reduces the space of the overlay invariant search, hence speeds up the computation.

Each pair-wise invariant contains a certain amount of error, and the error gets accumulated during propagation. Thus, increasing the number of propagation hops increases the amount of error that is introduced.

To minimize accumulated error, the representative system measurement node in the subnet should have as many immediate neighboring system measurement nodes as possible, so its estimated value through the overlay invariant can be propagated in one hop to as many non-representative system measurement nodes as possible.

In addition, the invariants between the representative system measurement nodes and the non-representative system measurement nodes should be as accurate as possible to minimize error accumulation. Since the accuracy of the pair-wise invariants is measured by the fitness score, the representative system measurement node should have the highest fitness scores with all other system measurement nodes within the subnet. This criteria is referred to herein as "most neighbors highest fitness score" (MNHF) rule. Based on the MNHF rule, the pseudocode of an algorithm or method for selecting the representative system measurement node for a subnet can include: for each node, calculate the summation of fitness scores fneighbor with all its immediate neighbors; pick the node with the largest fneighbor as the representative.

The representative system measurement nodes as well as all isolated nodes form a smaller metric set of measurement nodes that is used in block 530 of FIG. 5 as the response variable and the candidate input set. Specifically, each time one of the system measurement nodes of this set of measurement nodes is selected as a response variable, the remaining system measurement nodes from the set form the candidate input set. The next step is to select from the candidate set the measurement nodes that really determine the value of response and find out the specific formula of their relationship.

The mRMR subset selection process of the mRLR process of block 540 (FIG. 5) will now be described in greater detail. Given the candidate set, in principle, a least angle regression (LAR) can be applied to obtain the selected subset and the corresponding regression model. However, there are two drawbacks associated with the direct application of LAR. First, in large scale systems, even the candidate input set may contain thousands of measurements, and LAR tends to be slow in high dimensional space. Moreover, if time dependency is taken into consideration, the response variable at time t will not only depend on the inputs at time t, but also at time t−1, t−2 . . . , which means that the candidate set size is even several times larger than the original one. In that case a direct application of LAR would be not be very feasible. Second, the existence of multi-collinearity will affect LAR's accuracy. Multi-collinearity refers to a situation where a subset of inputs in a regression model are highly correlated, in other words, have an (approximately) linear relationship. Therefore, multi-collinearity decreases prediction accuracy and introduces redundancy. In most cases, the linear relationship in multi-collinearity is not perfect, but there could be perfect multi-collinearity.

For example, among 10 variables $x_1 \ldots x_{10}$, suppose there are $x_2=x_3+x_4$, then when $x_1$ is considered as the response variable, a perfect multi-collinearity exists among the candidate inputs $x_2 \ldots x_{10}$. Therefore, before applying LAR, a subset selection needs to be performed for two purposes: decreasing the size of candidate set to speed up the algorithm and breaking multi-collinearity.

Given a response variable, the criterion of subset selection is to find a set of measurement nodes which jointly have the largest dependency on the response variable. While this criterion is difficult to implement, the earlier mentioned mRMR process is used. The main idea of this process is ensuring that the selected subset has a high relevance with the response, but low redundancy inside itself. Instead of using mutual information, a fitness score is used as a metric for relevance and redundancy. The pseudocode for the mRMR-based process or algorithm is set forth below in Algorithm 1.

---
Algorithm 1
Minimal redundancy maximal relevance

Input: Response measurement $x_i$
    Candidate inputs $\{x_1 \ldots x_{i-1} x_{i+1} \ldots x_n\}$
    f(·,·) between each pair of measurements
    Number of inputs to be selected k
Outtput: The selected mRMR Set S
1:    Add $x_{j_1}$ with the largest $f(x_i, x_{j_1})$ to $S = \emptyset$
2:    for c = 2 to k do
3:
$$x_{jc} = \operatorname*{argmax}_{x_j \in X-S}\left(f(x_i, x_j) - \frac{1}{|S|}\sum_{x_l \in S} f(x_l, x_j)\right)$$
4:    Add $x_{j_c}$ to S.
5:    end for

--- where f (.,.) is the fitness score between two measurement nodes. Overall, the mRMR process of Algorithm 1 selects one input at each step. At each step c, for each measurement node $x_j$, the relevance ($R_1$) between node $x_j$ and the response variable $x_i$ is defined as the fitness score $f(x_i, x_j)$, and the redundancy ($R_2$) will introduce to the selected set is defined as the mean of the fitness scores with previously selected inputs. The intuition for the redundancy metric is that if one measurement node has a high fitness score with previously selected inputs, the measurement node has a high linear relationship with these selected inputs and this measurement node could be represented by the existing selected inputs. At each step, the measurement maximizing $R_1$-$R_2$ is selected.

Figure 6:
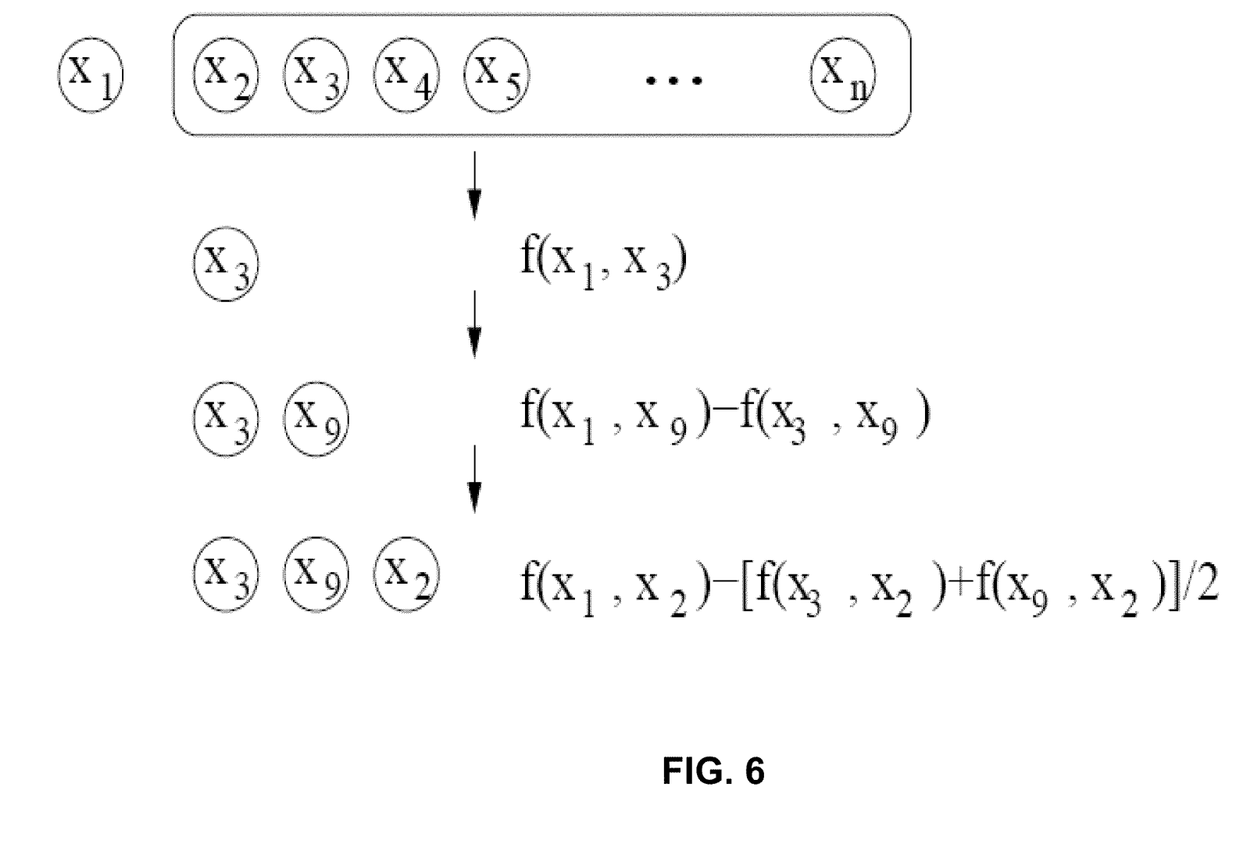
FIG. 6 is a graphical illustration of the operation of the mRMR subset selection process.

FIG. 6 graphically illustrates the operation of the mRMR subset selection process of Algorithm 1 as it applies to a specific example. In this example, the input includes node $x_1$ as the response variable and node $x_2 \ldots x_n$ as the candidate input set. After step 1, node $x_3$ is selected because it has the largest fitness score with node $x_1$. At step 2, node $x_9$ is selected because it maximizes $R_1$-$R_2$ where $R_1$=f($x_1$, $x_9$) and $R_2$=f($x_3$, $x_9$). At step 3, node $x_2$ is selected because it maximizes $R_1$-$R_2$ where $R_1$=f($x_1$, $x_2$) and $R_2$=[f($x_9$, $x_2$)+f ($x_9$, $x_2$)]/2 . . . .

Using the mRMR process, the number of candidate inputs is reduced to get a smaller set of measurement nodes which is referred to herein as the mRMR set. Note that the mRMR set is not necessarily equal to the exact subset determining the response variable, but could be reasonably larger. The LAR process of the mRLR process of block 540 (FIG. 5) described further on, will further remove unrelated measurement nodes. In addition, there is no guarantee that the mRMR subset selection process will break all multi-collinearities in the candidate inputs, but it will greatly ease the problem.

The LAR process of the mRLR process of block 540 (FIG. 5) performed on the mRMR subset to extract the overlay invariants will now be described. The mRMR set is inputted to the LAR to further reduce the variables and determine the regression coefficients. As is well known in the art, LAR selects a set of inputs in order based on "least angle" rule. If this selected set of ordered inputs is "a path," a determination must be made as to whether the path is good or not. Therefore the first input selected by the LAR process actually determines the whole path. If the first input is wrong, the whole path would be incorrect. Therefore, a more conservative strategy would be performing the LAR process from different start points. Therefore, the mRMR process is combined with the LAR process in the mRLR process to extract the overlay invariants. The pseudocode for mRLR process or algorithm is set forth below in Algorithm 2.

| Algorithm 2 Extracting overlay invariants | |
|---|---|
| Input: | Representative Set X = {$x_1$ . . . $x_n$} |
| | f(·,·) between each pair of representatives |
| | An upper bound u on num. of inputs in invariants |
| | Number of times m(=10) to run mRMR |
| | A threshold $\xi$(=0.9) on f(·,·) for verification |
| Output: | Overlay invariants and corresponding f(·,·) |
| 1: | Take first 80% of X as the training set $X^{train}$, and whole X as the validation set. |
| 2: | for i = 1 to n do |
| 3: | Take $x_i^{train}$ as the response variable, and $X^{train}$ − {$x_i^{train}$} as the Candidate Set C. |
| 4: | for q = 1 to m do |
| 5: | Use mRMR to select mRMR Set $S_q$ of 2u measurements from C. |
| 6: | Center $x_i^{train}$ and normalize the inputs in $S_q$. |
| 7: | Use LAR($x_i^{train}$, $S_q$, u) to get the regression model $\lambda_{iq}$, and the first variable $\alpha$ on LAR's path. |
| 8: | C = C − {$\alpha$}. |
| 9: | Apply $\lambda_{iq}$ to $X^{train}$ and X to get fitness score $f_{iq}^{train}$ and $f_{iq}$. $\lambda_{iq}$ is verified only if $f_{iq}^{train}$ > $\xi$ and $f_{iq}$ > $\xi$. |
| 10: | Mapping verified $\lambda_{iq}$ to unnormalized space. |
| 11: | end for |
| 12: | Select invariants from verified $\lambda_{iq}$ and keep the corresponding $f_{iq}$. |
| 13: | end for |

As input for the mRLR process of Algorithm 1, only the subnet representative nodes obtained from the process of block 520 of FIG. 5 are considered. The user needs to specify an upper bound u on the number of inputs each invariant will take, which is set by the system domain knowledge. For example, depending on the distributed computer system structure, an estimation is made that there will be no more than a certain number of inputs in any invariant. For example, the number of inputs in any invariant can be 20, and thus, u is set to equal 20. The user could also set the threshold of the fitness score (e.g., $\xi$=0.9) used in invariant verification and the number of times m (e.g., m=10) to run LAR, a larger m usually leads to a larger number of discovered invariants, but it is also more time consuming. Before the mRLR process begins, for each node $x_i$ as a sequence {$x_i$(1) . . . $x_i$(T)}, the first 80% of time series data is used as the training set, i.e., $X^{train}$, to discover the overlay invariants, and the whole dataset X will be used as the validation set. Each measurement node in $X^{train}$ is used as the response variable in turn, and the rest as the candidate inputs C, from which mRMR selects the mRMR set S to pass to LAR. Before running LAR, the response variable is centered to have zero mean, and the inputs are normalized to have zero mean and unit length. LAR will take two parameters, S and u, where u is used as a stopping criterion. After each run of LAR, the first variable on LAR's path will be removed from C, and then mRMR and LAR run successively again, so on so forth, for m times. Each time, by removing the first input in the previous run, LAR is forced to find a different input to start, resulting in a totally different path and a different regression model. Therefore, if the default LAR's path does not generate a good invariant, there are still chances to find another one in the following runs. For each invariant, the inputs with very small coefficients (e.g. less than 0.0001) can be removed, i.e., the inputs with very small impact on the response variable, to make the input set even smaller. In the end, only the regression models with fitness scores larger than. e.g., 0.9 on both $X^{train}$ and X are considered as verified invariants. For each response variable with multiple verified invariants, the invariant with the highest fitness score is selected, or all the verified invariants are selected (generally, one or multiple invariants for the same response variable can be selected for different purposes) The verified invariants are then mapped back to unnormalized space.

By using mRLR, on one hand, the search space is reduced dramatically through mRMR subset selection. On the other, the mRLR process is performed multiple times to explore more search space under the guidance of the previous search.

Figure 7:
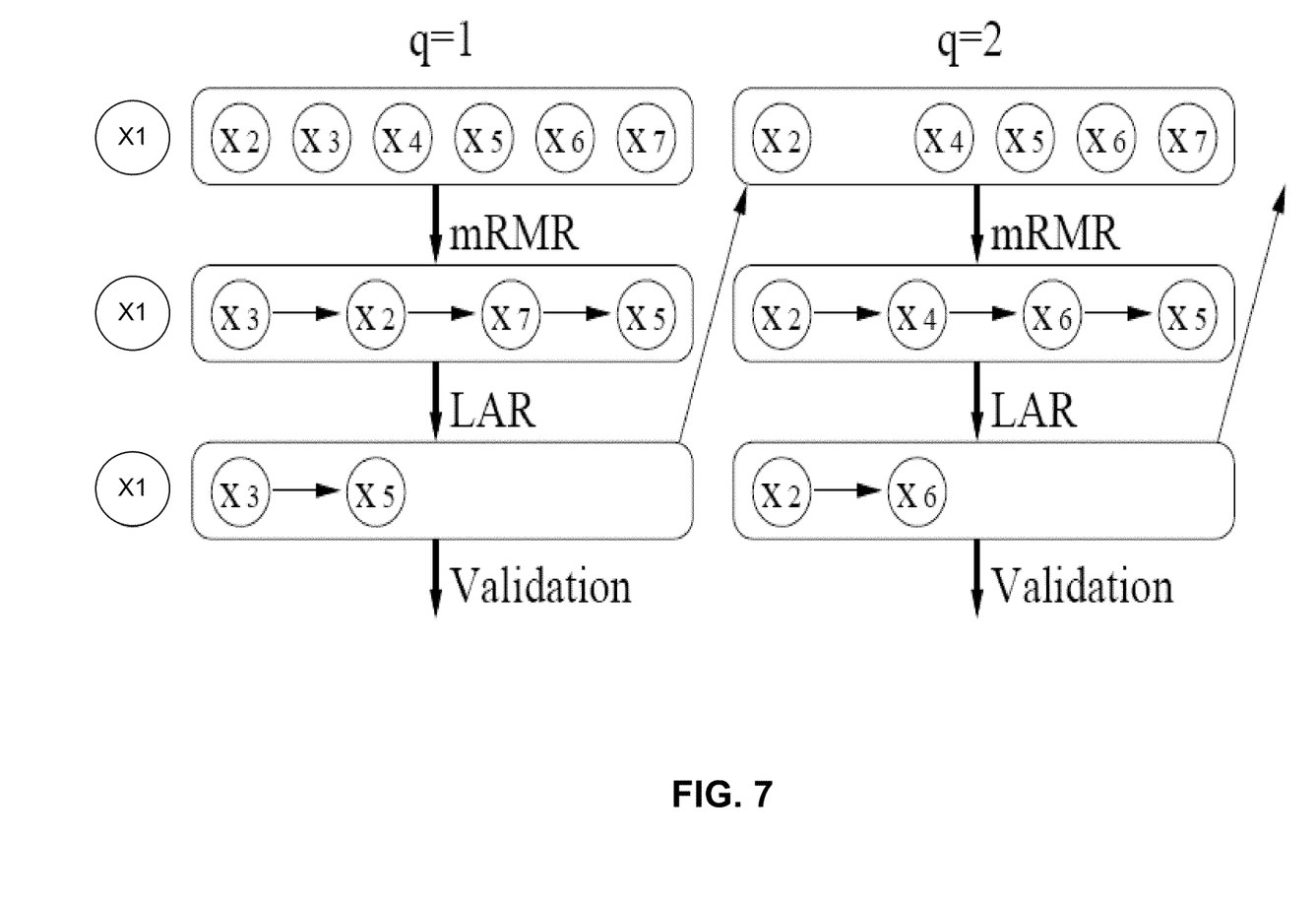
FIG. 7 is a graphical illustration of the operation of the mRLR process.

FIG. 7 graphically illustrates the operation of the mRLR process of Algorithm 2 as it applies to a specific example. Given a response variable $x_1$ and the representative/candidate node set $x_2$ . . . $x_7$, if u is set to equal 2, the first two iterations q=1, 2 are proceeded as follows: when q=1, an mRMR set is first selected from the candidate set. The selected inputs turn out to be nodes $x_3$, $x_2$, $x_7$, $x_5$ sequentially, then LAR runs to select the final subset, which in this example is in the order of nodes $x_3$, $x_5$ and the corresponding coefficients are determined, so nodes $x_3 \rightarrow x_5$ is one LAR path. The extracted regression model then goes into the verification phase, meanwhile, the first input on LAR path, node $x_3$, is removed from the candidate inputs, ending up with a reduced representative/candidate node set $x_2$, $x_4$, $x_5$, $x_6$, $x_7$, from which an mRMR set is selected again. The mRMR this time inputs nodes $x_2$, $x_4$, $x_6$, $x_5$ sequentially. Starting from this new mRMR set, LAR finds out a new path nodes $x_2 \rightarrow x_6$ different from the previous one, the process keeps on running for m iterations.

Due to system delay or unsynchronized data logging, the response variable $x_1$ at time t may not only depend on other variables at time t, but also their previous values at t−1, t−2 etc. Algorithm 2 could be extended to incorporate such time dependency. At step 7, for each response $x_1$(t), we originally feed LAR with the measurements at the same time t from $s_q$, i.e., {$x_{j1}$(t) . . . $x_{j2}$(t)}. When taking time dependency into consideration, we will include the independency into consideration, we will include the inputs from time t−d to t, where d is the maximum time lag for each input, i.e., we now feed LAR with {$x_1$(t−d) . . . $x_1$(t), . . . $x_{2_{l1}}$(t−d) . . . $x_{2_{l1}}$(t)}. LAR will then choose the proper inputs at the proper time. Since the mRMR Set is usually very small, our algorithm can still work compared to throwing the whole Candidate Set to LAR directly.

The overlay invariants connect the originally separated subnets of the pair-wise invariant network together, enabling the intensity flow to propagate across the subnets. The pair-wise invariants and overlay invariants can now be used together for performing the capacity planning process of block 340 in FIG. 3. The capacity planning process of the present disclosure involves estimating the capacity needs for as many reachable nodes in the invariant network using user workload. Each system measurement node may be a response variable in several different invariants, and one of them will be selected for use in capacity planning for this node.

The capacity planning process includes two rules for selecting invariants, in decreasing priority: 1) available invariants are selected first; and 2) select invariants with the highest fitness score first.

In rule 1, where available invariants are selected first, an invariant is available if all its inputs are available, i.e., the value of the inputs are known. Following this rule, for two invariants $\lambda_1$ and $\lambda_2$, if all input values of $\lambda_1$ are already known but some input values of $\lambda_2$ need to be calculated from another invariant, invariant $\lambda_1$ will be selected. From another perspective, this rule is equivalent to the shortest path first in invariant network.

In rule 2, where the highest fitness score is used first, for each response variable, if there are multiple available invariants, the invariant with the highest fitness score is selected because it generates the most accurate prediction.

The pseudocode for the two rule-based capacity planning process or algorithm is set forth below in Algorithm 3.

| Algorithm 3 Capacity planning based on invariants | |
|---|---|
| Input: | The set of all pairwise and overlay invariants A |
| | The set of available measurements A |
| Output: | Predicted values for all measurements in R |
| 1: | Set the set of reachable nodes R =A. |
| 2: | repeat |
| 3: | Given measurements in R, find out all active invariants $\Lambda^{act}$. |
| 4: | if Multiple invariants in $\Lambda^{act}$ have a same response variable then |
| 5: | Pick the one with the highest fitness score, |
| 6: | end if |
| 7: | Predict the values for all response variables in $\Lambda^{act}$ and add these response variables to R. |
| 8: | until R does not change. |

Figure 8:
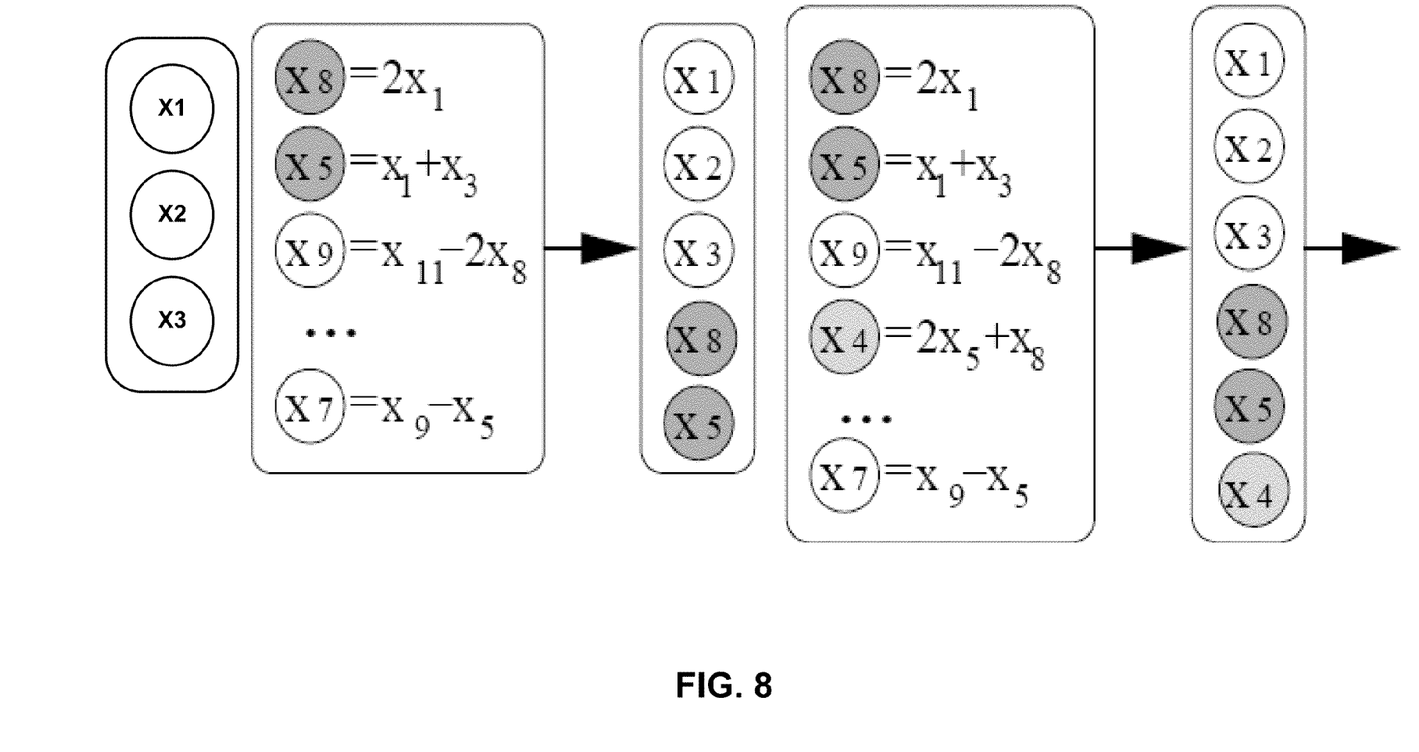
FIG. 8 is a graphical illustration of the operation of the capacity planning process/module.

Starting from a set of available measurements as reachable nodes (this is an estimation given by operators, where for example, during Christmas the workload will be 150% of normal workload), the capacity planning process searches available pair-wise and overlay invariants to predict the value of their response variable, which then also become reachable and further propagate to other nodes. The process keeps on running until no new reachable nodes could be discovered. FIG. 8 graphically illustrates the operation of the capacity planning process of Algorithm 3 as it applies to a specific example. Before the process starts, there are several available input nodes $x_1$, $x_2$, $x_3$ (measured or estimated by operators), and all extracted invariants, including pair-wise and overlay invariants. For the invariants only involving these available inputs, the value of their response is calculated, which in this case are available input nodes $x_8$ and $x_5$ (shaded in FIG. 8). Input nodes $x_8$ and $x_5$ are then added to the set of available system measurement nodes, and they make another invariant (both pairwise or overlay) with response variable $x_4$ available. Similarly, input node $x_4$ will be added as a new available input and the process starts a new iteration. In addition to discovering or determining all the reachable system measurement nodes, the set of unreachable nodes are determined. By analyzing the invariants involving these unreachable system measurement nodes, a determination is made of the measurement nodes whose values need to be collected in order to predict every system measurement node in the pair-wise/overlay invariant network. For more details regarding methods and apparatus for capacity planning and resource optimization in distributed computer systems, see the earlier mentioned co-pending U.S. patent application Ser. No. 11/860,610 filed Sep. 25, 2007.

Figure 9:
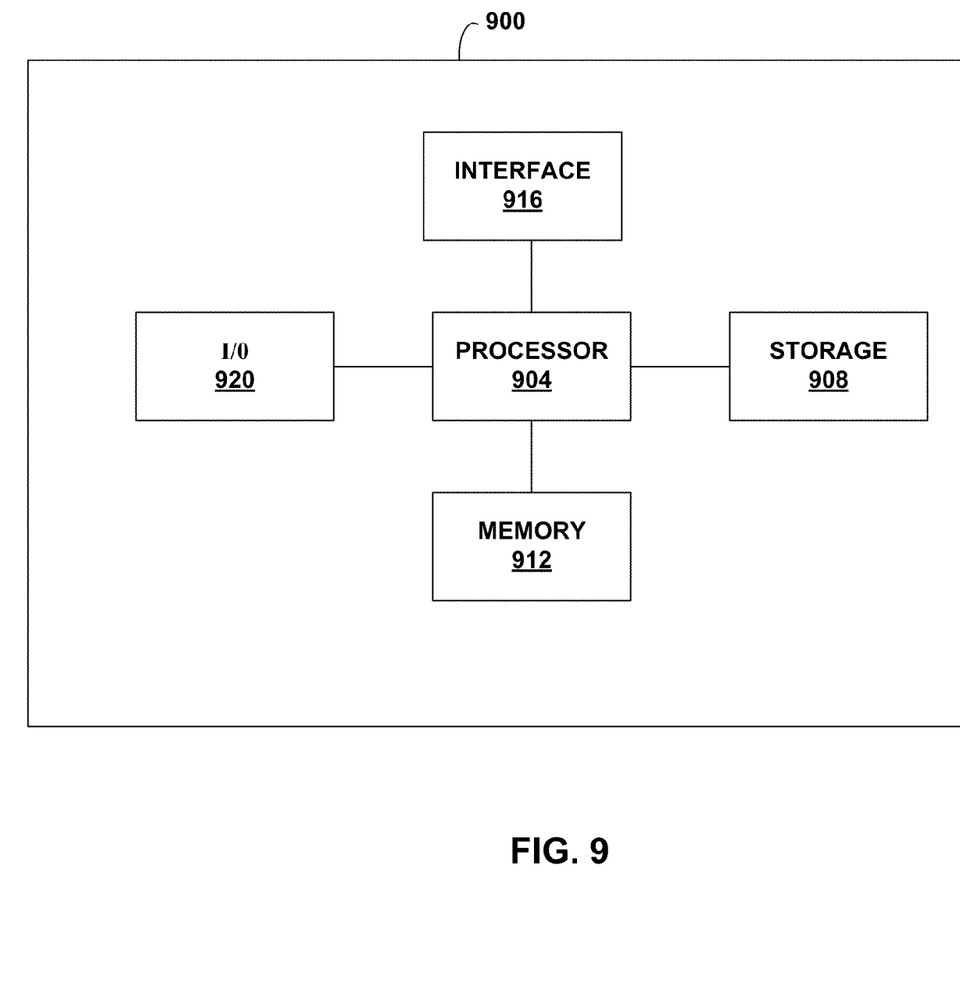
FIG. 9 is a block diagram of an embodiment of a computer that may be used for performing the method of the present disclosure.

The method of the present disclosure may be performed by an appropriately programmed computer, the configuration of which is well known in the art. An appropriate computer may be implemented, for example, using well known computer processors, memory units, storage devices, computer software, and other modules. A block diagram of a non-limiting embodiment of the computer is shown in FIG. 9 and denoted by reference numeral 900. The computer 900 includes, without limitation, a processor 904 which controls the overall operation of computer 900 by executing computer program instructions which define such operation. The computer program instructions can be stored in a storage device 908 (e.g., magnetic disk) and loaded into memory 912 when execution of the computer program instructions is desired. The computer 900 further includes one or more interfaces 916 for communicating with other devices (e.g., locally or via a network). The computer 900 still further includes input/output 920 which represents devices which allow for user interaction with the computer 900 (e.g., display, keyboard, mouse, speakers, buttons, etc.). The computer 900 may represent the capacity planning module and/or may execute the algorithms described above.

One skilled in the art will recognize that an implementation of an actual computer will contain other elements as well, and that FIG. 9 is a high level representation of some of the elements of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

While exemplary drawings and specific embodiments have been described and illustrated herein, it is to be understood that that the scope of the present disclosure is not to be limited to the particular embodiments discussed. Thus, the embodiments shall be regarded as illustrative rather than restrictive, and it should be understood that variations may be made in those embodiments by persons skilled in the art without departing from the scope of the present invention as set forth in the claims that follow and their structural and functional equivalents.

What is claimed is:

1. A method for determining a capacity need of one or more components in a distributed computer system, the computer system having a plurality of system measurement nodes distributed across the computer system, the method comprising:

in a computer process obtaining a flow intensity at each of the system measurement nodes, each of the flow intensities defining an intensity with which an internal measurement metric responds to a number of user workloads at the measurement node;

in a computer process finding pairs of the system measurement nodes that have flow intensities which are linearly related to one another under user workloads over time, each of the found pairs of the system measurement nodes defining pair-wise invariant coupled nodes;

in a computer process combining the pair-wise invariant coupled nodes into a pair-wise invariant network having two or more pair-wise subnetworks, wherein each of the pair-wise subnetworks includes one or more of the pair-wise invariant coupled nodes and wherein the pair-wise invariant coupled nodes of each of the subnetworks are isolated from and not connected with the pair-wise invariant coupled nodes of the other subnetworks;

in a computer process finding overlay invariants which connect certain ones of the system measurement nodes of the pair-wise invariant coupled nodes of the two or more pair-wise subnetworks to one another by:
   a) generating a representative set of system measurement nodes by selecting, in each of the two or more pair-wise subnetworks, one of the system measurement nodes of the pair-wise invariant coupled nodes that has a highest fitness score with all the other system measurement nodes of the pair-wise invariant coupled nodes of the subnetwork;
   b) selecting as a response variable one of the system measurement nodes of the representative set of system measurement nodes, the remaining ones of the system measurement nodes of the representative set of system measurement nodes defining a candidate input set for the response variable;
   c) determining which one or ones of the system measurement nodes of the candidate input set are most likely to have a relationship among each other; and
   d) determining the relationship among the system measurement nodes of the candidate input set that are most likely to have the relationship among each other, the relationship comprising the overlay invariant; and
   e) repeating steps b-d until all the system measurement nodes of the representative set of system measurement nodes has been selected as the response variable; and determining with the pair-wise and overlay invariants the capacity need of the one or more components in the distributed computer system.

2. The method of claim 1, wherein the one or more components include at least one of an operating system, an application software component, a central processing unit, a memory, a server, a networking device, and a storage device.

3. The method of claim 1, wherein the representative measurement node has the greatest number of neighboring flow intensity measurement nodes in the subnetwork.

4. The method of claim 1, wherein steps a-e are performed using minimal redundancy least regression computer process, the minimal redundancy least regression process including the selecting of the one of the representative system measurement nodes as the response variable and performing a minimal redundancy maximal relevance (mRMR) computer process to scan the remaining representative nodes of the set of representative nodes to produce a smaller set of the representative system measurement nodes that are most relevant to the response variable and have minimal redundancy among themselves.

5. The method of claim 4, wherein the overlay invariant is extracted from the smaller set of representative system measurement nodes.

6. The method of claim 4, wherein the minimal redundancy least regression computer process further includes performing a least angle regression computer process to determine coefficient parameters of the representative measurement nodes of the smaller set of representative nodes.

7. Apparatus for determining a capacity need of one or more components in a distributed computer system, the computer system having a plurality of system measurement nodes distributed across the computer system, said apparatus comprising:
   a processor executing instructions for:
      obtaining a flow intensity at each of the system measurement nodes, each of the flow intensities defining an intensity with which an internal measurement metric responds to a number of user workloads at the measurement node;
      finding pairs of the system measurement nodes that have flow intensities which are linearly related to one another under user workloads over time, each of the found pairs of the system measurement nodes defining pair-wise invariant coupled nodes;
      combining the pair-wise invariant coupled nodes into a pair-wise invariant network having two or more pair-wise subnetworks, wherein each of the pair-wise subnetworks includes one or more of the pair-wise invariant coupled nodes and wherein the pair-wise invariant coupled nodes of each of the subnetworks are isolated from and not connected with the pair-wise invariant coupled nodes of the other subnetworks;
      finding overlay invariants which connect certain ones of the system measurement nodes of the pair-wise invariant coupled nodes of the two or more pair-wise subnetworks to one another by:
         a) generating a representative set of system measurement nodes by selecting, in each of the two or more pair-wise subnetworks, one of the system measurement nodes of the pair-wise invariant coupled nodes that has a highest fitness score with all the other system measurement nodes of the pair-wise invariant coupled nodes of the subnetwork;
         b) selecting as a response variable one of the system measurement nodes of the representative set of system measurement nodes, the remaining ones of the system measurement nodes of the representative set of system measurement nodes defining a candidate input set for the response variable;
         c) determining which one or ones of the system measurement nodes of the candidate input set are most likely to have a relationship among each other; and
         d) determining the relationship among the system measurement nodes of the candidate input set that are most likely to have the relationship among each other, the relationship comprising the overlay invariant; and
         e) repeating steps b-d until all the system measurement nodes of the representative set of system measurement nodes has been selected as the response variable; and
      determining with the pair-wise and overlay invariants the capacity need of the one or more components in the distributed computer system.

8. The apparatus of claim 7, wherein the one or more components include at least one of an operating system, an application software component, a central processing unit, a memory, a server, a networking device, and a storage device.

9. The apparatus of claim 7, wherein the representative measurement node has the greatest number of neighboring flow intensity measurement nodes in the subnetwork.

10. The apparatus of claim 7, wherein steps a-e are performed using minimal redundancy least regression process, the minimal redundancy least regression process including the selecting of the one of the representative system measurement nodes as the response variable and performing a minimal redundancy maximal relevance (mRMR) process to scan the remaining representative nodes of the set of representative nodes to produce a smaller set of the representative system measurement nodes that are most relevant to the response variable and have minimal redundancy among themselves.

11. The apparatus of claim 10, wherein the overlay invariant is extracted from the smaller set of representative system measurement nodes.

12. The apparatus of claim 10, wherein the minimal redundancy least regression further includes performing a least angle regression process to determine coefficient parameters of the representative measurement nodes of the smaller set of representative nodes.

\* \* \* \* \*